United States Patent [19]

Cowen

[11] 4,028,947
[45] June 14, 1977

[54] FILM-RECORDING NOISE DOSIMETER
[75] Inventor: Steven J. Cowen, San Diego, Calif.
[73] Assignee: The United States of America as represented by the Secretary of the Navy, Washington, D.C.
[22] Filed: May 10, 1976
[21] Appl. No.: 684,527
[52] U.S. Cl. .................................. 73/557; 73/71.3; 179/1 N
[51] Int. Cl.² ........................................ G01H 3/12
[58] Field of Search ........... 73/71.3, 557, 556, 555, 73/552, 67.8 S; 346/108; 179/1 N, 1 MN, 1 SP

[56] References Cited
UNITED STATES PATENTS

| 3,543,229 | 11/1970 | Baum | 73/67.8 S |
|---|---|---|---|
| 3,778,552 | 12/1973 | Edinborgh | 179/1 N |
| 3,802,535 | 4/1974 | Peake et al. | 73/557 |
| 3,828,356 | 8/1974 | Wiers | 346/108 |
| 3,892,133 | 7/1975 | Quinn | 73/556 |

Primary Examiner—S. Clement Swisher
Assistant Examiner—Stephen A. Kreitman
Attorney, Agent, or Firm—Richard S. Sciascia; Ervin F. Johnston; Thomas Glenn Keough

[57] ABSTRACT

A noise dosimeter permanently records ambient noise levels over a period of time on photographic film to provide an indication proportional to the overall sound exposure level. Impinging acoustic energy is converted to representative potentials which are transformed into representative currents. These currents drive at least one light emitting diode which irradiates an area on an unexposed photographic film. The net degree of exposure over a period of time is read out or interpreted by a densitometer. The reading, proportional to sound exposure level, provides a record from which engineers, technicians, etc. can take the proper remedial action to avoid otherwise hazardous or detectable noise levels.

7 Claims, 4 Drawing Figures

FILM-RECORDING NOISE DOSIMETER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Audio engineers have long suspected that prolonged exposure to otherwise moderate sound levels might result in temporary or permanent damage to one's hearing. Designers of military hardware strive to keep the radiated noise levels at a minimum for obvious reasons. To date, sound or noise recording devices are far from satisfactory, particularly when airborne or waterborne energy is to be monitored over a period of time. One difficulty encountered is the design of a practical integrator with a great enough time constant to accurately integrate over a required time interval (8 to 24 hours). Noise recording devices using analog RC integrators require capacitors having impractically high leakage resistance to obtain the long time constants over the long time intervals. The analog-to-digital conversions necessary when digital techniques are employed also tended to affect complexity and long time reliability. A somewhat satisfactory approach relied upon a chemical conversion in a device known as an "E" cell. This device marketed by Plessey Semiconductors of Santa Ana, Calif. 92705 under the trade designation "560–002", stores a recoverable quantity of energy which is proportional to the total impinging sound energy over the selected time interval. However, highly specialized components and special read out instrumentation are needed for meaningful data. A further limitation of most of the long term responsive devices is that no permanent record is provided to enable a detailed analysis by engineers and technicians at a later date.

SUMMARY OF THE INVENTION

This invention is directed to providing an apparatus for determining the exposure to noise energy over a period of time. A microphone generates voltage signals which are representative of the impinging noise level. The voltage signals are transformed into current signals which drive a light emitting diode. A photographic film changes its transmissivity in response to irradiation from the light emitting diode to provide a permanent record of the net impinging noise energy.

An object of the invention is to provide a device for providing an indication of impinging noise over a prolonged period of time.

Yet another object is to provide a noise measuring device which gives a permanent record of noise.

Still another object is to provide a device employing at least one light emitting diode or other light source for irradiating a light sensitive surface.

Still another object is to provide an apparatus using photographic film to provide a permanent record of impinging noise exposure level.

Still another object is to provide an apparatus which prefogs a photographic film so that the film's change in transmissivity can be accurately read by a densitometer.

Yet another object is to provide an apparatus using several light emitting diodes coupled in parallel through comparators to provide an indication of sound exposure level over a wide range of impinging noise conditions.

These and other objects of the invention will become more readily apparent from the ensuing description when taken together with the drawings.

DESCRIPTION OF THE PREFERRED EMBODIMENT

Figure 1:
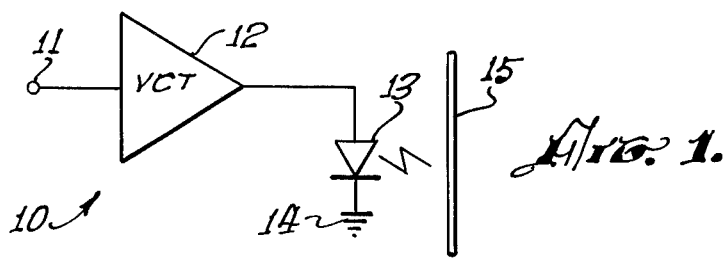
FIG. 1 shows a basic integrator employed in this invention.

Referring now to the drawings, a basic integrator circuit 10 is essential to the making of a permanent record of ambient noise. Input potentials appear at an input 11 and are transformed to current signals by a voltage-to-current transducer circuit 12.

A typical transducer circuit employs a suitably connected 741 operational amplifier for feeding a forward biasing current to a light emitting diode 13 coupled to ground 14. One light emitting diode which has functioned satisfactorily is marketed by the Hewlett-Packard Company under the trade designation "HP 5082–4984". This light emitting diode has the characteristics of radiating electro-magnetic energy in the form of visible light when a predetermined forward biasing current is coupled through it.

The electro-magnetic energy irradiates an unexposed photographic film 15. A film of the type marketed by the Kodak Corporation under the trade designation of "Plus-X-Pan" satisfactorily alters its transmissivity after development when the light from the Hewlett-Packard diode falls upon it. A densitometer provides a readout of the degree of alteration of the film's transmissivity as will be elaborated on below.

Figure 2:
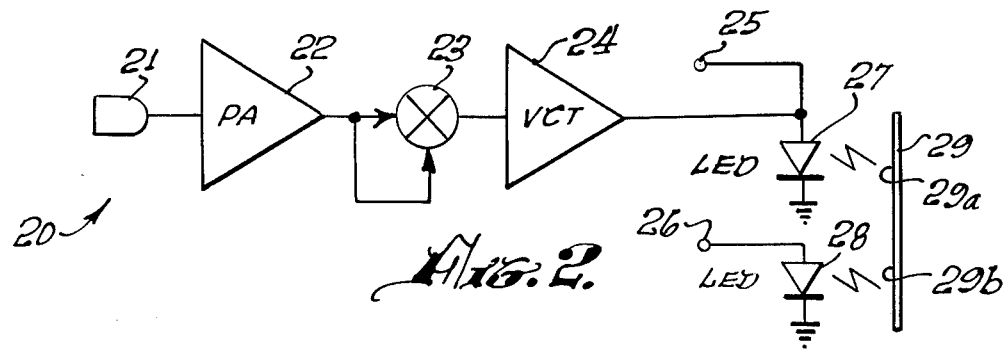
FIG. 2 is a representation of one embodiment of the invention.

The integrator circuit is used to provide responsive readouts of accumulated sound intensity over a period of time when combined with the circuitry of dosimeter 20 shown in FIG. 2 of the drawings. A conventional microphone 21 converts ambient sound into responsive voltage signals that are amplified and, possibly, frequency-weighted by a preamplifier circuit 22. The magnitude of the amplified signal is further processed by a four quadrant multiplier 23 serving as a squarer. A Burr-Brown "4203" fulfills this function quite well.

The squared voltage signals are fed to a voltage-to-current transducer circuit 24 which in turn drives a following light emitting diode 27. Circuit 24 is substantially identical to circuit 12. Here, however, the light emitting diode is brought to irradiate a photographic film 29 to a preestablished prefog level via an external signal applied at an input 25. This same prefog level signal is fed to an input 26 of a substantially identical light emitting diode 28.

The photographic film 29 is prefogged on an area 29a and 29b by light emitting diodes 27 and 28, respectively, to provide for better recording linearity of the film. Because film 29 is prefogged by only the prefogging signal on an area 29b and prefogged on an area 29a by the prefogging signal and the signal attributed to noise exposure level, discrepancies due to differences in emulsion batches and in developing procedures can be recognized and compensated for. The difference in the transmissivities of the two areas of the film is proportional to the net exposure to the noise.

Figure 3:
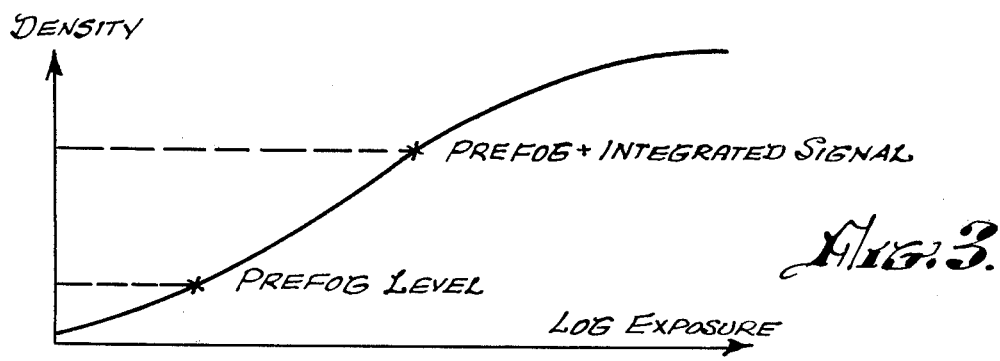
FIG. 3 depicts a transfer curve of a typical photographic film.

Prefogging also provides more accurate readouts. Noting FIG. 3, a typical film exhibits a more linear response when it is biased to place a minimum density exposure point above the knee of its transfer curve.

The exposure of 29b is compared with the exposure at area 29a on the photographic film. This comparison is made using a densitometer and empirically the net exposure to ambient noise over the predetermined period of time is established. In other words, having been exposed to a known noise exposure level over a period of time a lack in transmissivity of a photographic film is noted and used as a basis for later readings. Greater or lesser noise exposures correspondingly will affect the transmissivity of the photographic film.

An accurate readout of ambient noise exposure level is obtainable over a thirty to forty dB dynamic range for high crest factor signals. Similarly, the four quadrant multipliers can be utilized to serve as squarers over a 40 dB dynamic range. A dosimeter fabricated as outlined above should work accurately over this range and provide a readout covering, for example, between 1% to 1000% of an allowable noise energy exposure.

Figure 4:
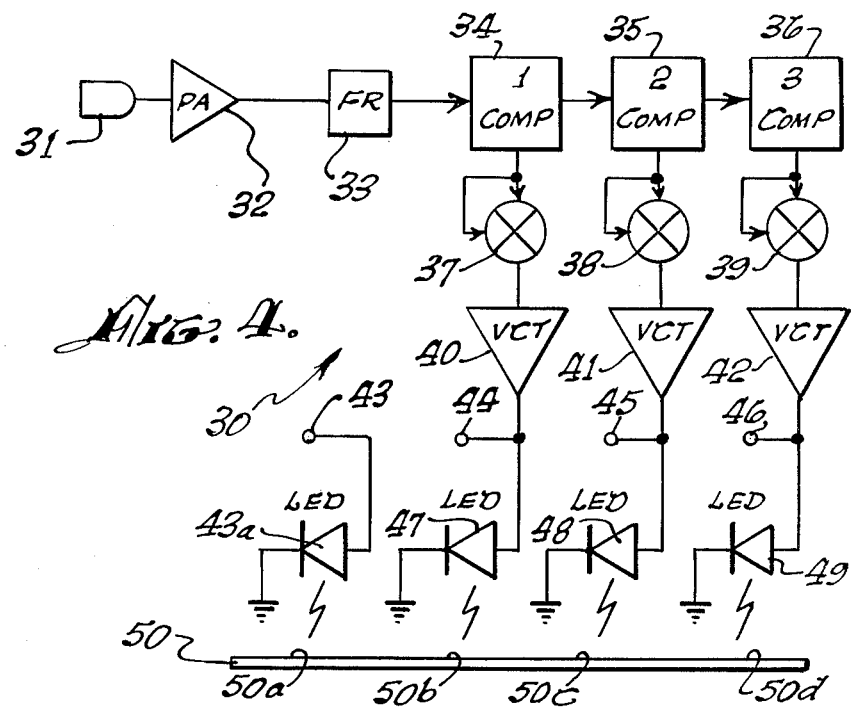
FIG. 4 shows an embodiment of the invention having an extended range.

The embodiment of FIG. 4 has an extended dynamic range. A microphone 31 and a preamp 32 feed the representative voltage signals to a full wave rectifier 33. The rectified signals are coupled to comparators 34, 35, and 36 connected in parallel. Each comparator is fabricated in accordance with accepted design criteria within the state-of-the-art and passes signals onto respectively interconnected squarers 37, 38, and 39 when certain successively larger signal magnitudes have been exceeded. When such magnitudes have been exceeded, voltage to current transducers 40, 41, and 42 are actuated to generate forward biasing currents for driving respective light emitting diodes.

Prefog signals of identical magnitude are coupled to inputs 43, 44, 45, and 46 to effect a prefogging irradiation from light emitting diodes 43a, 47, 48, and 49. This prefogging level of irradiation impinges upon an unexposed photographic film 59 on areas 50a, 50b, 50c, and 50d. This normalizes the film for reading with a densitometer which will follow later.

Statistical distribution information is available if the signal is routed to more than one detector of different levels of noise exposure. For example, if noise levels exceed the preset comparison level in comparator 34, the excess would "spill over" to comparator 35 which would drive light emitting diode 48. More intense noise levels would create voltage signals exceeding the threshold of comparator 36 and its associated light emitting diode would irradiate area 50d. The losses in transmissivity of areas 50a, 50b, 50c, and 50d of the photographic film can be weighted and summed to determine the net noise exposure.

In the foregoing described embodiments the schematic depiction of the relationship of the light emitting diodes to the photographic film is for purposes of demonstrating the inventive concept only. One having ordinary skill in the art of the subject matter to which this invention pertains would take appropriate steps to ensure that random exposure of the film would be prevented by appropriate housings and baffles and that the proper biasing potentials for the electronic circuits would be suitably connected. Such structure and electronics circuitry have been deleted to avoid belaboring the obvious.

The photographic film exposed to the radiated energy from the light emitting diodes is easily developed and read by conventional techniques to provide a permanent record of ambient noise. Engineers, technicians and others have a permanent record from which design changes or other remedial actions can be taken. Such a permanent record as provided by this noise dosimeter is reuseable for comparison purposes to subsequent noise records to give designers an indication as to whether or not they are proceeding in the right direction.

Obviously, many modifications and variations of the present invention are possible in the light of the above teachings, and, it is therefore understood that within the scope of the disclosed inventive concept, the invention may be practiced otherwise than as specifically described.

What is claimed is:

1. An apparatus for determining the exposure to noise energy over a period of time comprising:
    means responsive to the noise level for generating representative voltage signals;
    means coupled to the generating means for creating current signals from the representative voltage signals; first means coupled to creating means for radiating electromagnetic energy proportional to the current signals;
    means disposed to receive the radiated electromagnetic energy for changing its transmissivity in a first location proportional to the quantity of the radiated electromagnetic energy impinging thereon to thereby provide an indication of the exposure to noise energy; and
    second means for radiating a datum level of electromagnetic energy on a second location on the changing means to create a preestablished transmissivity thereby providing a basis from which the relative magnitude of the radiated electromagnetic energy of the first radiating means is compared.

2. An apparatus for determining the exposure to noise energy over a period of time comprising:
    means responsive to the noise level for generating representative voltage signals;
    means coupled to the generating means for creating current signals from the representative voltage signals;
    first means coupled to creating means for radiating electromagnetic energy proportional to the current signals;
    means disposed to receive the radiated electromagnetic energy for changing its transmissivity in a first location proportional to the quantity of the radiated electromagnetic energy impinging thereon to thereby provide an indication of the exposure to noise energy;
    second means for radiating a datum level of electromagnetic energy on a second location on the changing means to create a preestablished transmissivity thereby providing a basis from which the relative magnitude of the radiated electromagnetic energy of the first radiating means is compared; and
    means coupled to the first radiating means for feeding the datum level of electromagnetic energy to the first radiating means for radiation on the first location.

3. An apparatus according to claim 2 in which the changing means is a photographic film exposing its first and second locations to the first and second radiating means.

4. An apparatus according to claim 3 further including:
a plurality of signal comparators coupled to receive the representative voltage signals and connected in parallel with respect to each other, each of the comparators has a radiating means serially connected therewith to expose a plurality of separated locations on the photographic film.

5. An apparatus according to claim 4 in which the generating means is a microphone coupled to a preamplifier and all the radiating means are optionally light emitting diodes and other light emitting devices.

6. An apparatus according to claim 5 further including:
a full wave rectifier interposed between the preamplifier and the plurality of comparators for providing the representative voltage signals thereto.

7. An apparatus according to claim 6 in which the comparators pass signals to their interconnected light emitting diodes at different thresholds to provide indications of noise energy over a wide range.

* * * * *